(No Model.)
J. R. SCOTT.
SKIVING MACHINE.
No. 443,409. Patented Dec. 23, 1890.
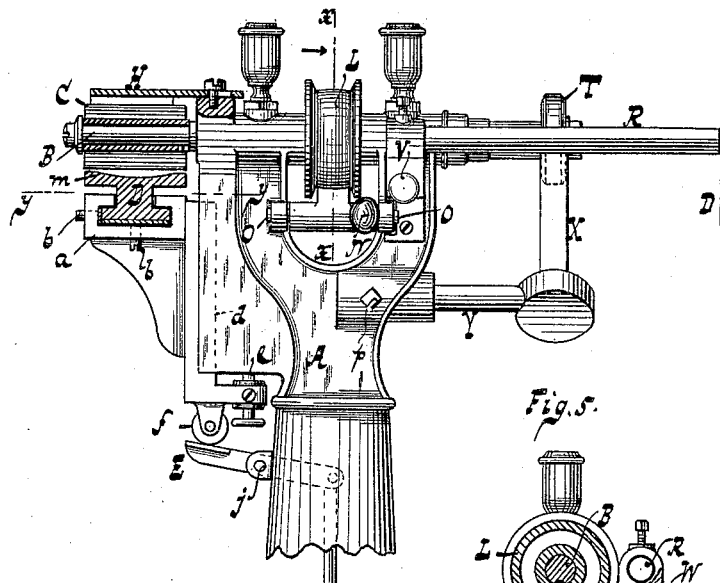
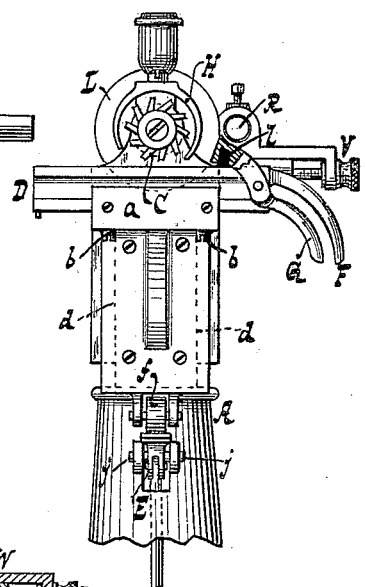
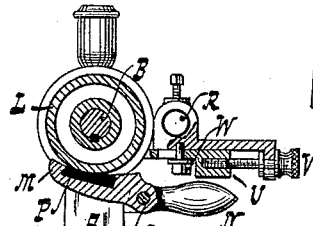
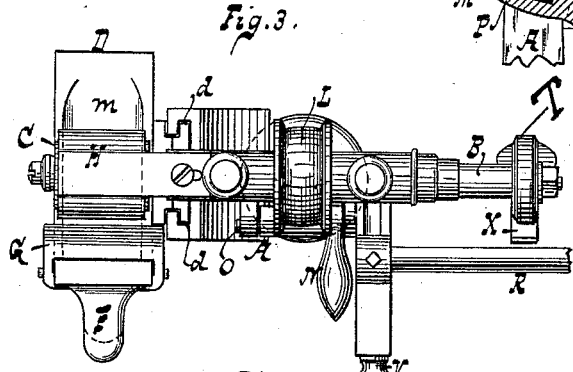
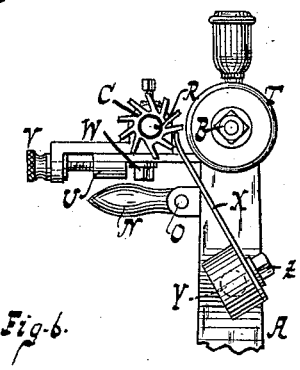
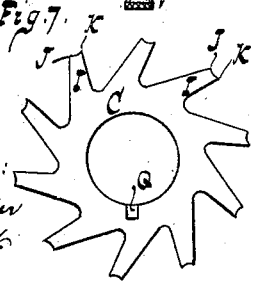
WITNESSES:
William Miller
Edward Wolff
INVENTOR:
Jacob R. Scott
BY
Van Santvoord & Hauff,
ATTORNEYS

UNITED STATES PATENT OFFICE.

JACOB R. SCOTT, OF NYACK, NEW YORK.

SKIVING-MACHINE.

SPECIFICATION forming part of Letters Patent No. 443,409, dated December 23, 1890.

Application filed September 11, 1890. Serial No. 364,653. (No model.)

*To all whom it may concern:*

Be it known that I, JACOB R. SCOTT, a citizen of the United States, residing at Nyack, in the county of Rockland and State of New York, have invented new and useful Improvements in Skiving-Machines, of which the following is a specification.

This invention has for its object to improve and render more useful the leather-skiving machine for which Letters Patent No. 439,433 were issued to me October 28, 1890, to simplify the construction of parts and avoid the pivot or journal required for a table that swings in the arc of a circle, and to provide novel means whereby the table can be reciprocated in a rectilinear horizontal path on a support which is vertically adjustable.

To accomplish all these objects the present invention involves the features of construction, the combination or arrangement of parts, and the principles of operation hereinafter described and claimed, reference being made to the accompanying drawings, in which—

Figure 1 is a side elevation of a skiving-machine containing my invention. Fig. 2 is an end view of Fig. 1. Fig. 3 is a plan view of Fig. 1. Fig. 4 is an end view, partly in section, from the end opposite to that exposed in Fig. 2. Fig. 5 is a section along $xx$, Fig. 1. Fig. 6 is a section along $yy$, Fig. 1. Fig. 7 is a detail view of a cutter.

In the drawings, the letter A designates a frame or standard, which forms the bearings for a shaft B, on which is mounted the cutter C. The table D is intended to support the material to be acted on by the cutter. This table is movable in the direction at right angles to the axis of the cutter, and in the example shown in the drawings the table moves along a rectilinear guide $a$. The wear of the table caused by its sliding in the guide $a$ can be taken up by compensating screws $b$, so that the table always runs smooth and without rattling or shaking in the guide.

The guide is connected to the frame or support A by a tongue-and-groove connection or dovetail $d$, so that said guide can be vertically moved or adjusted. A set-screw or stop $e$ prevents the guide being raised too high.

The lever E, fulcrumed at $j$, can be made to raise the guide, and a friction-roller $f$ takes up the friction of the lever E, so as to prevent wear.

The table is provided with a handle F and with a clamp or clamping-lever G, fulcrumed on the handle and having a rubber or elastic pad $l$, so that said clamp will readily hold the work upon the table against the action of the cutter. The guard H extends over the cutter and prevents the clamp G, as also the fingers of the operator, from coming into contact with the cutter.

The surface of the table has a cavity $m$. This cavity $m$ can be varied in shape, or, if desired, entirely omitted, as required by the articles to be skived.

The cutter C, as seen in Fig. 7, is formed with blades or teeth I, each blade having its outer face concaved, so as to form a cutting edge or toe K and a heel J. The toe K does the cutting, and the heel J, following close on the toe, holds the work against the table so as to prevent puckering or bulging of the work.

To the shaft B is secured a pulley or drum L, against which a lever or friction-stop M N, fulcrumed at O, can be made to act. The M N has a rubber or elastic pad P to readily take hold of the drum, so that the operator can rapidly stop the machine in an emergency, such as to prevent breakage to parts or injury to the person.

The cutter can be readily secured to the shaft B by providing said cutter with a notch Q, Fig. 7, which notch is engaged by a stud or projection on the shaft, and the cutter can be held on the shaft by a suitable screw-head or nut. By having the outer faces of the blades I concave, the cutter can be readily ground, since by mounting the cutter on the arm R and allowing the outer faces of the blades to rest against the grinding-disk T on shaft B the proper concavity will be readily ground into the blades. The arm R can be adjusted along its support U by the screw V and fixed in the proper spot by the set-screw W.

While being ground the cutter is prevented from turning on the arm R by a side of a blade I resting against a stop finger or pawl X, adjustably secured to a supporting-arm Y. The set-screw Z allows the finger X to be adjusted on the arm Y, and the set-screw $p$ allows the arm Y to be adjusted on the frame or support A. In Fig. 4 a cutter is shown in position to be ground.

What I claim as new, and desire to secure by Letters Patent, is—

1. In a skiving-machine, the combination, with a frame or standard having a rotary cutter-shaft provided with a cutter, of a horizontal rectilinear guide having a vertically-sliding connection with the frame or standard, means for moving the guide vertically, and a horizontal work-supporting table movable rectilinearly in a horizontal plane on the guide at right angles to the axis of the cutter-shaft and to the line of vertical adjustment of the guide, and means for retaining the work on the table, substantially as described.

2. In a skiving-machine, the combination, with a frame or standard, a rotating cutter-shaft, and a cutter thereupon, of a vertically-movable rectilinear guide arranged horizontally below the cutter and having a tongue-and-groove connection with the frame or standard and a work-supporting table movable rectilinearly on the guide in a horizontal plane at right angles to the axis of the shaft and provided with means for retaining the work thereon, substantially as described.

3. In a skiving-machine, the combination, with a frame or standard, a rotating cutter-shaft, and a cutter on the shaft, of a vertically-movable rectilinear guide arranged horizontally below the cutter and having a tongue-and-groove connection with the frame or standard, and provided at its lower end with a set-screw to abut a part of the frame or standard and limit the rising movement of the guide, a work-supporting table movable rectilinearly on the guide in a horizontal plane at right angles to the axis of the cutter-shaft, and a lever for raising the guide and table, substantially as described.

4. In a skiving-machine, the combination, with a cutter, of a table for supporting the work, a rectilinear guide for the table, said guide being connected to the machine by a tongue-and-groove connection, so as to be vertically adjustable, and having an anti-friction roller $f$, and a lifting-lever made to act on said roller to raise the guide, substantially as described.

5. In a skiving-machine, the combination, with a frame or standard, a rotating cutter-shaft, and a cutter on the shaft, of a vertically-movable rectilinear guide on the frame or standard, a work-supporting table movable rectilinearly on the guide in a horizontal plane at right angles to the axis of the cutter-shaft, and set-screws carried by the vertically-movable guide to compensate for the wear of the work-supporting table, substantially as described.

6. In a skiving-machine, the combination, with a frame or standard, a rotating cutter-shaft, and a cutter thereupon, of a work-supporting table having a handle and movable vertically to and from the cutter and laterally at right angles to the axis of the cutter-shaft, and provided with a pivoted clamping-lever arranged in juxtaposition to the handle of the table, and having an elastic pad for holding the work in a fixed position on the surface of the table, substantially as described.

In testimony whereof I have hereunto set my hand in the presence of two subscribing witnesses.

JACOB R. SCOTT.

Witnesses:
WM. C. HAUFF,
E. F. KASTENHUBER.